United States Patent [19]

Autechaud et al.

[11] Patent Number: 6,128,709
[45] Date of Patent: Oct. 3, 2000

[54] ATOMIC OPERATION IN REMOTE STORAGE AND DEVICE FOR EXECUTING THIS OPERATION

[75] Inventors: Jean-François Autechaud, Paris; Christophe Dionet, Ivry sur Seine, both of France

[73] Assignee: Bull, S.A., Louveciennes, France

[21] Appl. No.: 08/953,668

[22] Filed: Oct. 17, 1997

[30] Foreign Application Priority Data

Oct. 18, 1996 [FR] France .................................. 96 12719

[51] Int. Cl.$^7$ ........................................ G06F 13/16
[52] U.S. Cl. .................... 711/151; 711/100; 711/101; 711/118; 711/145; 711/147; 711/152
[58] Field of Search ..................... 711/118, 145, 711/100, 101, 147, 151, 152

[56] References Cited

U.S. PATENT DOCUMENTS

| | | | |
|---|---|---|---|
| 5,325,487 | 6/1994 | Au et al. | 711/131 |
| 5,613,071 | 3/1997 | Rankin et al. | 707/10 |
| 5,644,716 | 7/1997 | Autechaud et al. | 709/213 |
| 5,666,546 | 9/1997 | Donnan | 711/145 |
| 5,835,742 | 11/1998 | James et al. | 710/130 |

FOREIGN PATENT DOCUMENTS

| | | |
|---|---|---|
| 0240616 | 4/1986 | European Pat. Off. . |
| 0580961 | 4/1993 | European Pat. Off. . |
| 0629948 | 6/1994 | European Pat. Off. . |

Primary Examiner—Do Hyun Yoo
Assistant Examiner—Than Nguyen
Attorney, Agent, or Firm—Miles & Stockbridge P.C.; Edward J. Kondracki

[57] ABSTRACT

In order to allow a plurality of remote data processing systems (1, 2) to communicate with one another by means of a storage unit (8) shared among these remote systems, each data processing system (1, 2) has the capability to reserve itself temporary exclusive access to the storage unit (8) by means of atomic operations. One particular atomic operation used is comprised of replacing a current value of a register (OPA) in the storage unit (8) with a new value communicated by the data processing system (1, 2) remote from the storage unit, it being understood that the remote data processing system knows an old value of the register (OPA) that is not necessarily equal to its current value. A device is installed in a storage controller (7, 16, 27) for the purpose of executing the atomic operation locally relative to the storage unit (8).

14 Claims, 5 Drawing Sheets

ATOMIC OPERATION IN REMOTE STORAGE AND DEVICE FOR EXECUTING THIS OPERATION

CROSS-REFERENCE TO RELATED APPLICATION

The subject matter of this application is related to the subject matter of U.S. application Ser. No. 08/867,410 filed Jun. 2, 1997, now U.S. Pat. No. 6,029,233, which is assigned to the assignee of the subject application.

The subject matter of this application is also related to the subject matter of U.S. application Ser. No. 08/867,404 filed Jun. 2, 1997, which is assigned to the assignee of the subject application.

BACKGROUND OF THE INVENTION

The scope of application of the invention is the sharing of a storage unit expanded by a plurality of data processing systems, the expanded storage or memory unit and the data processing systems being remote from one another.

DESCRIPTION OF THE RELATED ART

In order to allow two or more remote systems to communicate with one another, links can be provided between each of these systems, by means of which messages are exchanged.

Another possibility is comprised of sharing the resources of one or more expanded storage units among the remote systems. Access by two or more systems to common resources of an expanded storage unit allows these systems to communicate with one another.

However, in order to ensure the consistency of the data of the expanded storage or memory unit that can be processed by various systems, it is necessary for a system not to modify this data while another system is processing it. Various known means are used to ensure this, such as the placement of a lock on a data block accessed by a system in order to deny access to this data block to other systems until the lock is released, or the incrementation of a pointer in an area of the expanded storage unit in order to reserve access to this area by a system while allowing free access to the subsequent areas for other systems. In this case it is essential that between the placement of a lock or the incrementation of a pointer by a system and the effective reservation of this lock or of the storage area pointed to, another system does not place this lock or increment the pointer differently from the same value. The placement of a lock or the incrementation of a pointer requires a minimum of processing, to see whether the lock is free and then allocate it to a system, or to read a pointer, increment it, and then re-write the new value of the pointer. For this purpose, atomic operations are normally used. An atomic operation is an indivisible logic operation, that is, an operation whose execution cannot be disturbed by any other logic operation. By way of example, it is possible to cite known atomic operations such as "test&set", "read&clear" or "compare&swap". Between the start and the end of its execution, an atomic operation creates a critical section outside of which the operation must be carried out completely or not at all.

There are currently a number of existing solutions for solving the problems of executing atomic operations in elements of a system located in proximity to the central processors that control these operations. It is important to recognize that the proximity of the elements in which atomic operations are carried out to the central processors allows short access times and noise immunity, thus reducing the risk of disturbance. Potential disturbances can be handled by relatively simple hardware means acting over short distances.

However, a non-negligible distance between a system and the elements outside this system in which an atomic operation controlled by a central processor of this system is to be executed poses specific problems. The transfer time for a command and its return between the system and the element can be long enough for a modification of the status of this element by another system to occur between the sending of this command and its action in the remote element. If an error occurs during the execution of the atomic operation, it is necessary to make sure that the operation has not been executed partially, allowing an incomplete modification of the remote element to subsist. For example, a lock must not be placed without being known to the system that ordered the placement of this lock by means of an atomic operation. Connection errors can result from the remoteness of the element that is subject to the effect of the atomic operation.

SUMMARY OF THE INVENTION

In order to eliminate the above-mentioned drawbacks, the invention relates to a process for controlling by a data processing system an atomic operation in a first register located in a remote storage or memory unit, characterized in that it is comprised of two steps followed by a third step which is a function of the result of the first two steps, the first step being comprised of loading, in a second register locally attached to the first register, an old value of the first register as known by the data processing system;

the second step being comprised of comparing, locally relative to the first register, the old value of the first register to a current value of this first register and, in accordance with the result of this comparison, of replacing this current value with a new value communicated by the data processing system;

the third step being comprised of communicating to the data processing system the current value of the first register.

It should be noted that the term "locally attached" as used herein is intended to mean in the immediate vicinity. Thus, the second register must be in the immediate vicinity of the first register so that the time for data to travel on a short distance is so small that there is little or no chance for the value contained in the first register to change before data arrives in the second register.

It must also be noted that only the first and the third step are o subject to communication constraints. By carrying out the second step, which constitutes an indivisible operation, locally relative to the element to be modified, the invention makes it possible to reduce the critical section considerably.

It is possible to provide for two registers to be reserved in the remote storage or memory unit, specifically reserved for the system controlling the operation. One of the registers serves as the second register in which the old value is written in the first step and the other register is for writing the new value used in the second step. This requires a processing of the reservation of the registers and the existence of a register write operation in the remote storage or memory unit by the system controlling the operation.

In order to optimize the access to the remote storage unit, it may be preferable to implement this access in data blocks, since the size of a block is greater than that of a register. A storage controller in communication with the remote data processing system executes block-by-block read and write operations in the storage unit to which it is locally attached. In order to read a register contained in the remote storage unit, the data processing system reads the entire block containing this register. In order to write in one or more registers contained in a block of the remote storage unit, the data processing system orders a partial writing of a certain number of sub-block(s) of the block containing these registers. In order to execute this order, the storage controller reads this block, modifies the contents of only the sub-blocks of the partial write operation, leaving the others unchanged, and re-writes the entire block in the storage unit.

An advantageous variant of the invention is characterized in that the second register is located in a storage controller locally attached to the remote storage unit, this storage controller comprising a third register in which the current value of the first register is written as a result of a command to partially write the block of the storage unit containing this first register so as to write the new value in this first register.

An advantageous component of the invention for carrying out a "compare&swap" operation is characterized in that the current value is replaced by the new value if and only if the result of the comparison indicates that the old value is equal to the current value.

An advantageous component of the invention for carrying out a "test&set" operation or a "read&clear" operation is characterized in that the current value is replaced by the new value no matter what the result of the comparison and that the first two steps are always followed by the third step.

For the purpose of executing atomic operations, the invention also relates to a storage control device comprising a stack, at least one of whose inputs is connected to a bus for receiving data originating from a storage unit and to a bus for receiving data originating from a remote data processing system by means of a first multiplexer, and at least one of whose outputs is connected to a bus for sending data to this storage unit by means of a first combinational logic circuit, characterized in that it comprises:

a register whose input is connected to the bus for receiving data originating from the storage unit and whose output is connected to a bus for sending data to the remote data processing system by means of a second multiplexer; and a combinational logic circuit for disabling the writing of at least one input of the stack and for sending the data directed to this input to the register.

It is advantageous to use the invention to allow a plurality of remote data processing systems to communicate with one another by means of a storage unit shared among these remote systems. Each data processing system has the capability of reserving itself temporary exclusive access to the storage unit using atomic operations. One particular atomic operation used is comprised of replacing a current value of a register in the storage unit with a new value communicated by the data processing system remote from the storage unit, it being understood that the remote data processing system knows an old value of the register that is not necessarily equal to the current value. A device is installed in a storage controller for the purpose of executing the atomic operation locally relative to the storage unit.

BRIEF DESCRIPTION OF THE DRAWINGS

The invention will be more clearly understood with the aid of the following description in reference to the figures.

DESCRIPTION OF THE PREFERRED EMBODIMENTS

Figure 1:
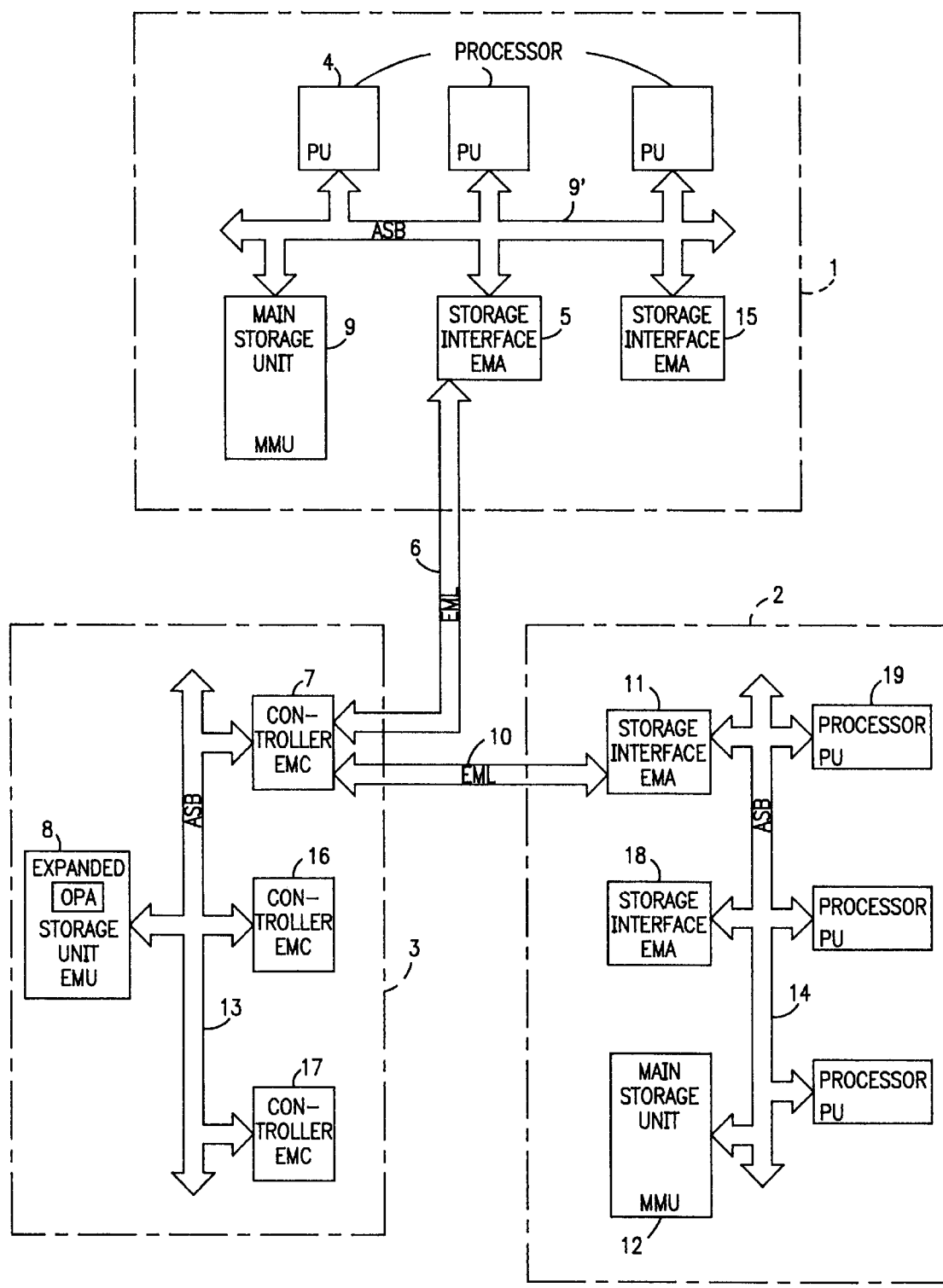
FIG. 1 represents two data processing systems communicating by means of a common expanded storage unit.

In FIG. 1, a computer 1 comprises a main storage unit MMU 9 accessed by at least one processor PU 4 by means of a system bus ASB 9'. One or more expanded storage access interfaces EMA are connected to the bus ASB 9'. The interface EMA 5 is connected to an expanded storage controller EMC 7 located in a cabinet 3 remote from the computer 1, by means of a link EML 6. A link EML can be a serial link or a parallel link allowing a high-speed transfer of information. The cabinet 3 comprises-an expanded storage unit EMU 8 accessed by the expanded storage controller 7 by means of a system bus ASB 13. Other controllers EMC 16, 17, whose quantity represented in the figure is not limitative, can also be provided for accessing the expanded storage unit EMU 8 by means of the system bus 13. The controller 16 makes it possible, for example, to exchange data with another computer, not represented, according to the same diagram as for the computer 1. It is possible to provide for the expanded storage controller EMC 7 to also be connected to an interface 11 of a computer 2 by means of a link EML 10. Like the computer 1, the computer 2 comprises at least one processor PU 19 and one main storage unit MMU 12 accessed by the interface 11 by means of a system bus ASB 14. Another interface EMA 18, the quantity of the interfaces represented in the figure not being limitative, can also be provided for accessing the main storage unit MMU 12 by means of a system bus 14. A first port of the interface 18 makes it possible, for example, to exchange data with another cabinet, not represented, according to the same diagram as for the cabinet 3. The computers 1 and 2 constitute systems remote from the expanded storage unit EMU 8.

The computer 1 in FIG. 1 has a second interface EMA 15, also connected to the system bus 9'. By connecting a first port of the interface EMA 15 to a first port of the controller EMC 17 and a second port of the interface 18 to a second port of the controller EMC 17, by means of links EML not represented for the sake of clarity in the figure, it is possible to obtain a redundancy of the connections of the computers 1 and 2 with the cabinet 3. The second port of the interface 15 is then available to exchange data with another cabinet, not represented, which contains an expanded storage unit.

The expanded storage units EMU 8 and 12 are each subdivided into $2^j$ pages whose addresses are coded in j bits. Each page is in turn subdivided into $2^k$ data blocks whose addresses are coded in k bits. The width of the data path from the interface EMA 5 to the controller EMC 7 through the link EML 6 is $2^m$ bytes. A byte is, for example, an octet or a nonet. Thus $2_m$ bytes constitute a sub-block of a data block. Each data block contains $2_m$ sub-blocks, addressable in n bits within a block.

Figure 2:
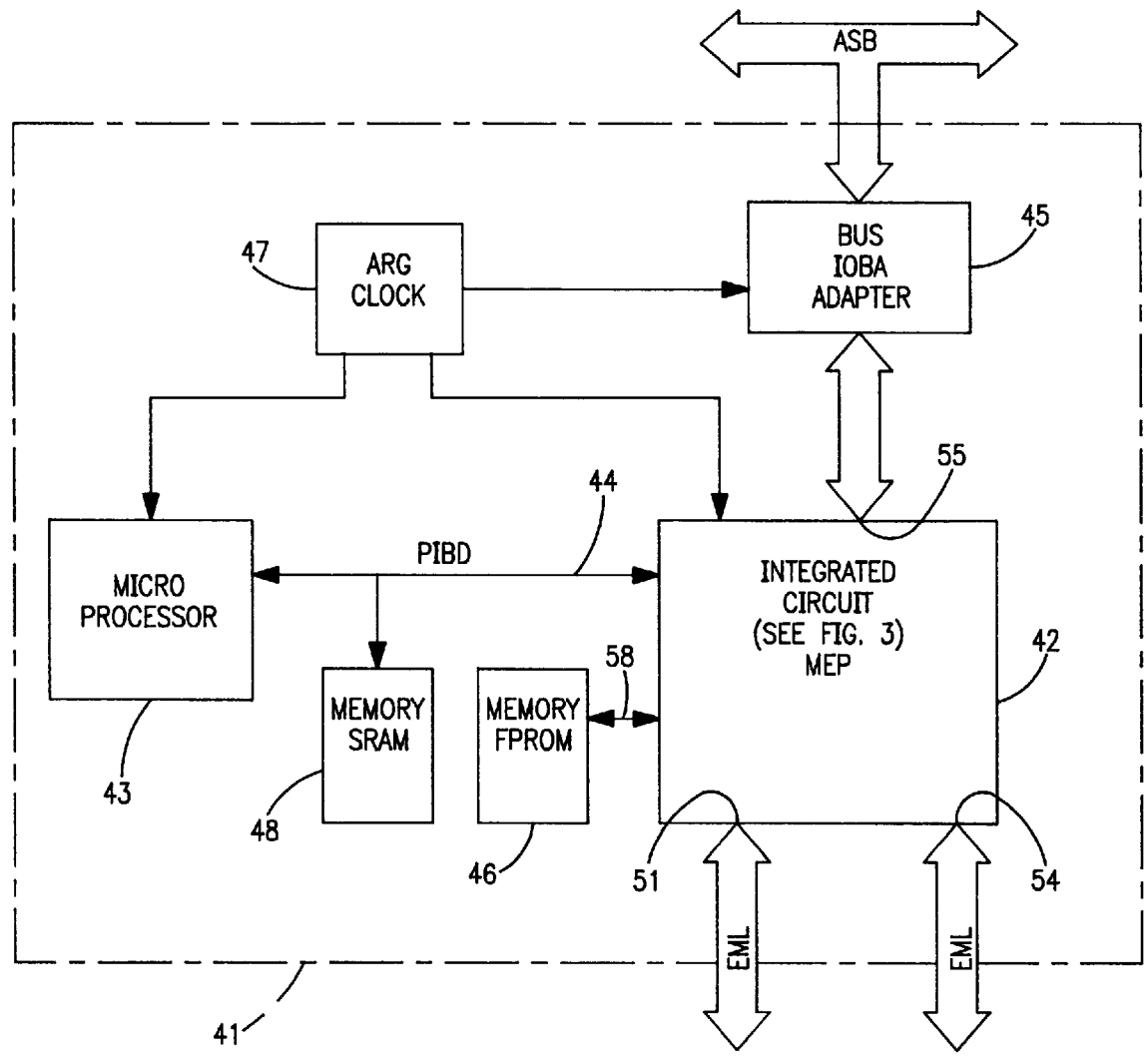
FIG. 2 represents an example of a coupler which allows two data processing systems to communicate.

An interface EMA or a storage controller EMC is embodied by means of a circuit 41, presented in greater detail in FIG. 2. The circuit 41 essentially comprises an integrated circuit MEP 42, described in detail in reference to FIG. 3, synchronized by a clock generator ARG 47 and controlled by a microprocessor 43. A permanent memory FPROM 46 contains microcode for operating the integrated circuit 42. A random access memory SRAM 48 is provided for containing the data which qualify the moves processed by the circuit 41. At the initialization of the circuit 41, the integrated circuit 42 loads into the memory 48 the microcode contained in the memory 46. In order to do this, the circuit 42 directly accesses the memory 46 by means of a link 58. The memory 46 essentially guarantees the permanence of the information at initialization while the memory 48 guarantees the access performance during operation. If the read-write standards in the memories 46 and 48 are different, for example in one byte in the memory 46 and in eight bytes in the memory 48, the integrated circuit 42 performs the necessary regrouping of bytes and generates the appropriate parity checks. A bus adaptor circuit IOBA 45 makes it possible to adapt the circuit 41 to the system bus ASB for the transfer of data between the bus ASB and the integrated circuit 42. The circuit 45 and the microprocessor 43 are synchronized by the clock generator 47. The microprocessor 43 exchanges and processes the data from the memory 48 and the circuit 42 using a bus PIBD 44 and the microcode contained in the memory 48. The circuit 42 comprises an input-output port 55 connected to the adaptor circuit 45 and two input-output ports 51 and 54 connected by a link EML to a remote circuit identical to the circuit 41. A circuit 41 operating in EMA is connected to a circuit 41 operating in EMC. The width of the data path is identical in the ports 51, 54, and 55 and is equal to $2^m$ bytes. The advantage of the adaptor 45 is that it can support an addressability different from a standard addressability in the ports 51, 54 and 55. For example, the addressing of the ports 51, 54 and 55 can be done in 40 bits, while the addressing of the main storage unit MMU can be done in 32 bits.

Figure 5:
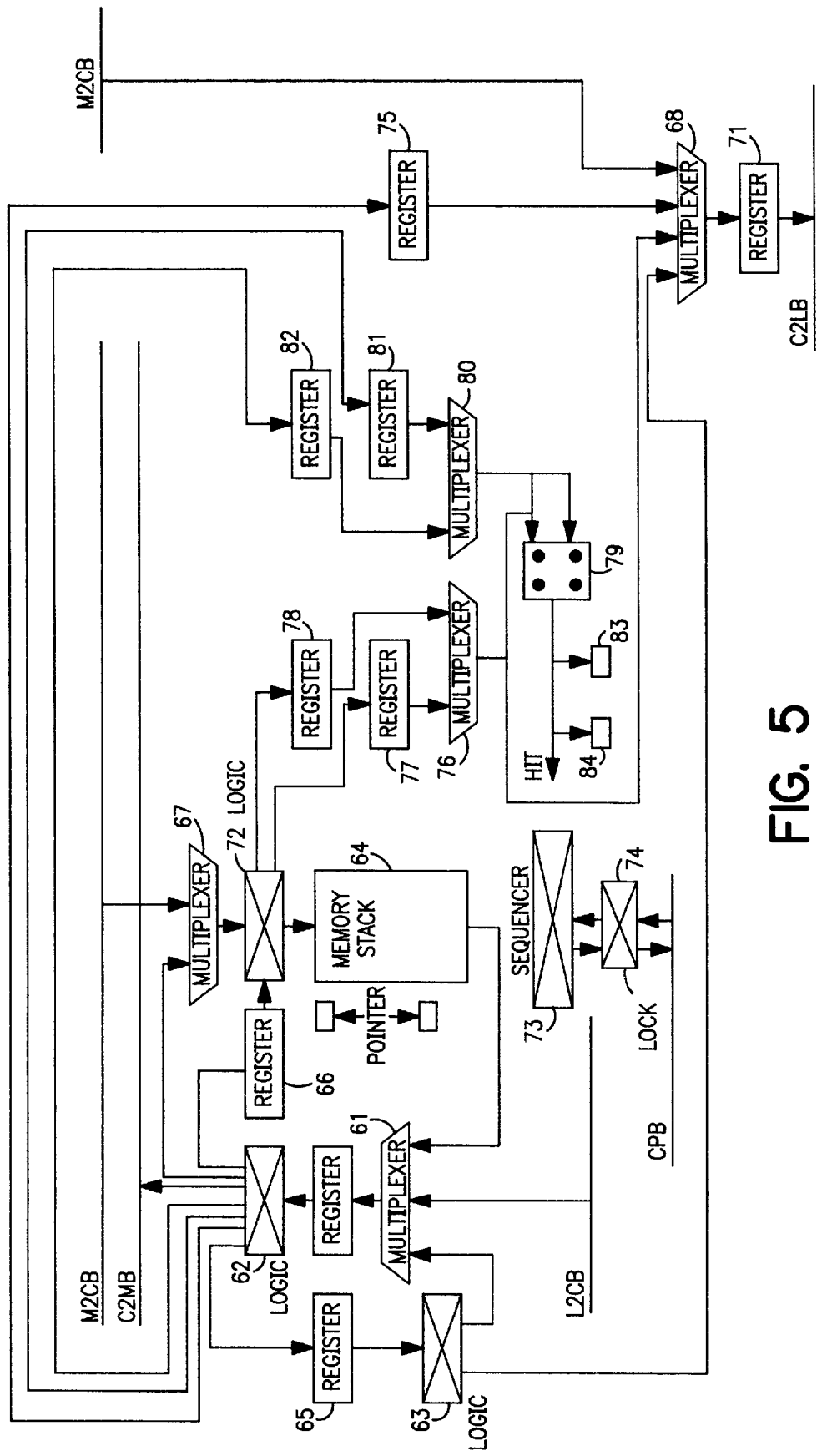
FIG. 5 represents a device according to the invention.

Within the scope of the invention, the microprocessor 43 is not indispensable to the operation in EMC of the circuit 41 insofar as the functions executed are of a hardware nature, as will be seen in reference to FIG. 5.

Figure 3:
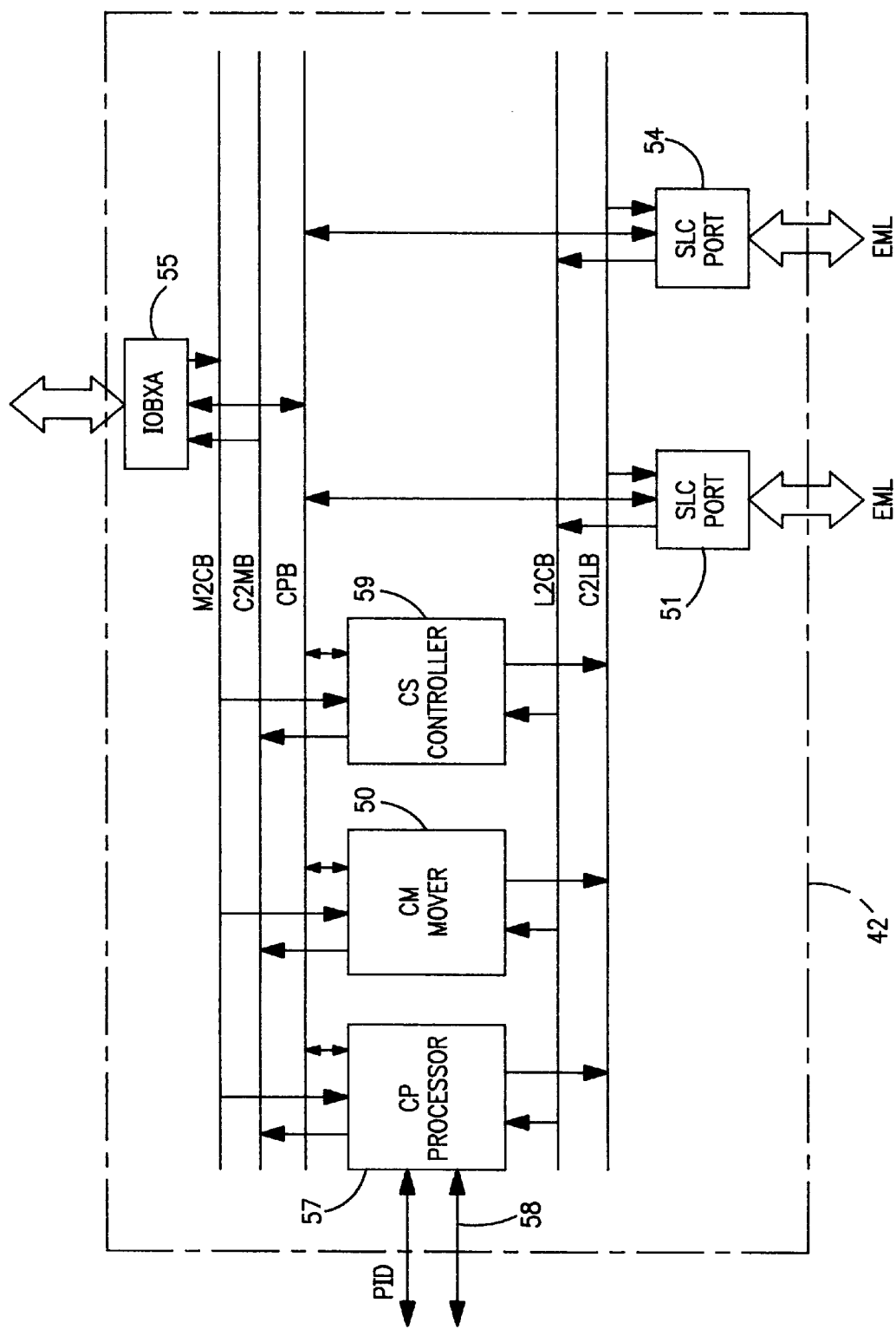
FIG. 3 represents an example of a circuit into which it is possible to integrate the device of the invention.

FIG. 3 presents the architecture of the integrated circuit 42. A processor unit CP 57 allows the exchange of data for qualifying a move with the microprocessor 43 by means of the bus PIBD. The processor unit 57 is directly connected to the memory 46 by the link 58 for the purpose of loading, at initialization in the memory 48, the microcode contained permanently in the memory 46. A mover unit CM 50 is activated by the processor unit 57 in the case where the integrated circuit 42 is mounted in a circuit 41 which takes the place of an interface EMA. A controller unit CS 59 is activated by the processor unit 57 in the case where the integrated circuit 42 is mounted in a circuit 41 which takes the place of a controller EMC.

In order to eliminate the microprocessor 43, it is possible to provide for the controller unit CS 59 to be activated in a way that involves hardware only, for example by means of a jumper or a switch disposed in the circuit 41. In EMC operation, the mover unit CM 50 and the processor unit 57 only appear in order to simplify the production of the integrated circuit 42, which is identical for EMA and EMC operation. This allows circuits 42 to be interchangeable in a card 5 or a card 7. The operation of interest within the scope of the invention is that in the EMC mode.

Figure 4:
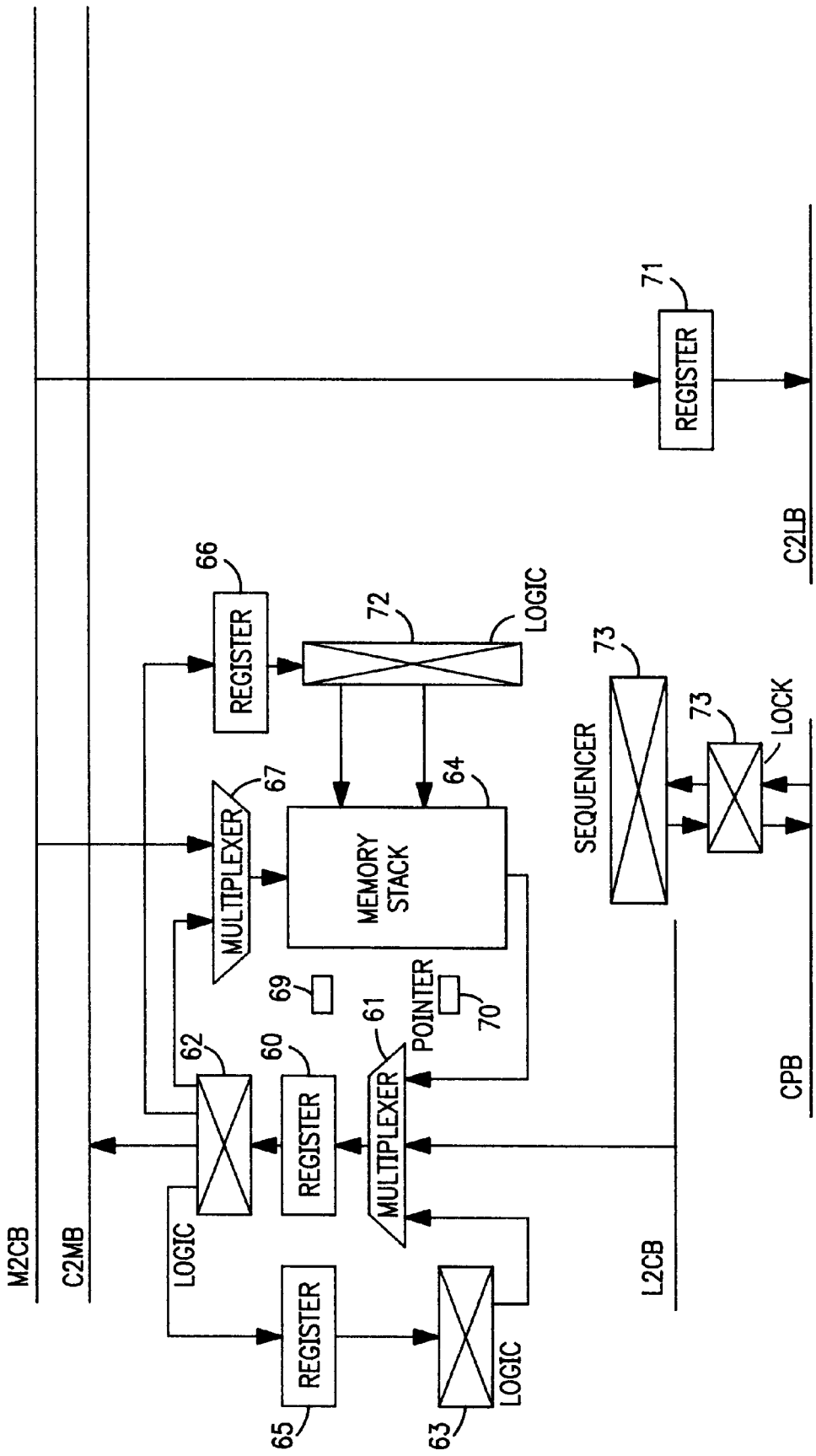
FIG. 4 represents a device which makes it possible to execute a partial write operation.

The data exchanged with the memory located in the same cabinet as that in which the circuit 41 is installed pass through the port 55. If the circuit 41 is installed in the computer 1, the local memory is the main storage unit MMU. If the circuit 41 is installed in the cabinet 3, the local memory is the expanded storage unit EMU. A bus M2CB transfers the data from the port 55 to the processor unit 57, to the mover unit CM 50 or to the controller unit CS 59. A bus C2MB transfers the data from the processor unit 57, from the mover unit CM 50 or from the controller unit CS 59 to the port 55. The data exchanged with the remote memories pass through the ports 51 and 54. If the circuit 41 is installed in a computer 1 or 2, the remote memory is the expanded storage unit EMU of the cabinet 3. If the circuit 41 is mounted in the cabinet 3, the remote memory is the main storage unit MMU of a computer 1 or 2. A bus L2CB transfers the data from the port 51, 54 to the processor unit 57, to the mover unit CM 50 or to the controller unit CS 59. A bus C2LB transfers the data from the processor unit 57, from the mover unit CM 50 or from the controller unit CS 59 to the port 51, 54. A bidirectional bus CPB allows the processor unit 57 to exchange data with the ports 51, 54, 55, with the mover unit 50 or with the controller unit 59, FIG. 4 represents the architecture of the storage controller CS 59 for carrying out read operations $R2^{n+m}B$, write operations $W2^{n+m}B$ in blocks of $2^{n+m}$ bytes and partial write operations $PW2^{n+m}B$ of a whole number of sub-blocks of $2^m$ bytes within a block, in the expanded storage unit EMU.

A register 60, with a size equal to the width of the data path, has an input connected to the output of a multiplexer 61 and an output connected to the input of a combinational logic circuit 62. The multiplexer 61 has a first input connected to the bus L2CB, a second input connected to a first output of a combinational logic circuit 63 and a third input connected to the output of a stack 64, provided for containing $2^n$ sub-blocks of $2^m$ bytes each. The combinational logic circuit 62 has a first output connected to the input of a register 65, with a size equal to the size of the addresses in the expanded storage unit EMU, a second output connected to the bus C2MB, a third output connected to the input of a register 66 designed to contain $2^n$ bits so as to be able to subscript two sub-blocks of the stack 64, and a fourth output connected to a first input of a multiplexer 67. The combinational logic circuit 63 has an input connected to an output of the register 65. The stack 64, of the FIFO type, receives as input an output from the multiplexer 67 in $2^n$ registers, each of which has a size equal to the width of the data path, using an input pointer 69, and dumps using an output pointer 70. The multiplexer 67 has a second input connected to the bus M2CB. A register 71 has an input connected to the bus M2CB and an output connected to the bus C2LB. A hard-wired combinational logic circuit 72 receives as input two values, each coded in n bits, provided by the register 66. The first value indicates the location, in a block of the stack 64, of a sub-block from which to disable the write operation by means of the circuit 72. The second value indicates the next location, in a block of the stack 64, of a sub-block from which to re-enable the write operation by means of the circuit 72.

The inputs and outputs of the multiplexers 61 and 67.are each equal in size to the width of the data path, that is, they can allow the throughput of one sub-block of $2^m$ bytes in a clock cycle. The throughput of data in the various elements described is achieved by means of a sequencer 73 whose links with the various elements 60 through 72 are not represented so as not to complicate the figure unnecessarily. The sequencer 73 is connected to a locking device 74 that is itself connected by direct links to identical devices 74 of the controllers CS of all the circuits EMC 7, 16, 17 of the same expanded storage unit EMU. The locking device 74 prevents several circuits EMC from simultaneously accessing the expanded storage unit EMU by allowing only one sequencer 73 to operate at a time. In order to obtain an equitable sharing of access by several controllers CS of different circuits EMC, the locking device 74 adheres, for example, to a circular-type priority for access to the storage unit (8). This means that an access to the storage unit by a controller CS gives it the lowest priority for the next access.

The storage controller CS whose structure has just been described makes it possible to execute read operations $R2^{n+m}B$, write operations $W2^{n+m}B$ in blocks of $2^{n+m}$ bytes, and partial write operations $PW2^{n+m}B$ of a whole number of sub-blocks of $2^m$ bytes within a block, in the expanded storage unit EMU in the manner described below.

A read operation $R2^{n+m}B$ is carried out in the following way. A read request message sent by a remote system 1, 2 arrives at the first input of the multiplexer 61 through the bus L2CB, in a first clock cycle. In a second clock cycle, the read request message is transferred into the register 60. If the read request message is coded in only one sub-block, the first input of the multiplexer 61 is then available to receive another message from the bus L2CB. In a third clock cycle, the read request message is transferred to the bus C2MB by means of the combinational logic circuit 62, to be sent to the expanded storage unit EMU. The expanded storage unit EMU sends a response message to the bus M2CB which arrives at the input of the register 71 to be transferred to the bus C2LB. The response message is generally composed of one sub-block containing the header of the message followed by a data block such that the sub-blocks are transferred in each clock cycle from the bus M2CB into the register 71, then in the next cycle, from the register 71 to the bus C2LB.

A write operation $W2^{n+m}B$ is carried out in the following way. A write request message is generally composed of one or more sub-blocks containing the header of the message followed by a data block sent by a remote system 1, 2. The first sub-block of the message arrives at the first input of the multiplexer 61 through the bus L2CB, in a first clock cycle. In a second clock cycle, the first sub-block is transferred into the register 60. The first input of the multiplexer 61 is then available to receive the next sub-block from the bus L2CB. In a third clock cycle, the first sub-block is transferred to the bus C2MB by means of the combinational logic circuit 62, to be sent to the expanded storage unit EMU. The process is repeated for all of the sub-blocks until the sub-blocks of a message have run out. The expanded storage unit EMU sends a response message to the bus M2CB which arrives at the input of the register 71 to be transferred to the bus C2LB. The response message is generally composed of one or more sub-blocks containing a write acknowledgment, which are transferred in each clock cycle from the bus M2CB to the input of the register 71, and from the output of the register 71 to the bus C2LM in the next cycle.

A partial write operation $PW2^{n+m}B$ makes it possible to write a stream of contiguous sub-blocks within a block. A partial write request message is generally composed of one or more sub-blocks containing the header of the message followed by sub-blocks of data sent by a remote system 1, 2. The first sub-block of the message arrives at the first input of the multiplexer 61 through the bus L2CB, in a first clock cycle. In a second clock cycle, the first sub-block is transferred into the register 60. The first input of the multiplexer 61 is then available to receive the next sub-block from the bus L2CB. The header of the message contains, among other things, the locations of the fist and the last sub-block in a block, each of which is coded in n bits, as well as an address of the block in which the partial write is executed in the expanded storage unit MMU. In connection with the sequencer 73, the combinational logic circuit 62 sends the 2n bits coding the locations of the first and last sub-block to the register 66 and sends the address of the block to the register 65. The combinational logic circuit 62 then sends the sub-blbcks to be written to the stack 64 via the first input of the multiplexer 67 by setting the input pointer 69 to the location of the first sub-block in the block. After receiving the last sub-block to be written detected by the combinational logic circuit 62, the combinational logic circuit 63, triggered by the sequencer 73, generates a read request $R2^{n+m}B$ from the content of the register 65, which it transmits to the register 60 via the second input of the multiplexer 61. The combinational logic circuit 62 then sends the read request message to the bus C2MB to be sent to the expanded storage unit EMU. The input pointer 69 is reset to point to the first input of the stack 64. The data block of the message in response to the read request received from the expanded storage unit EMU by the bus M2CB arrives at the second input of the-multiplexer 67 to be transferred sub-block by sub-block into the stack 64. The input pointer 69 is incremented with each arrival of a new sub-block until the entire block has been written into the stack 64. However, since the hardwired combinational logic circuit 72 has disabled the writing of the registers of the stack 64 into which the sub-blocks of the partial write would have been written, the writing of the block received in the response message is only effective for sub-blocks other than those of the partial write. Thus, the stack 64 contains a block from the expanded storage unit in which a stream of contiguous sub-blocks has been replaced by the stream of contiguous sub-blocks of the partial write $PW2^{n+m}B$. In connection with the sequencer 73, the combinational logic circuit 63 generates a header for a write request $W2^{n+m}B$ from the content of the register 65, which it loads into the register 60 via the second input of the multiplexer 61. The sequencer 73 then transfers the content of the stack 64, sub-block by sub-block, using the incremented output pointer 70, from the first register of the stack 64 to the register 60 via the third input of the multiplexer 61. Thus, the combinational logic circuit 62 transfers to the bus C2MB a write request message $W2^{n+m}B$ constituted by the header generated by the circuit 63 followed by the block contained in the stack 64, to be sent to the expanded storage unit EMU. After the writing of the block in the expanded storage unit EMU, the expanded storage unit EMU sends a response message to the bus M2CB, which arrives at the input of the register 71 to be transferred to the bus C2LB. The response message is generally composed of one or more sub-blocks containing a write acknowledgement, which are transferred in each clock cycle from the bus M2CB to the input of the register 71, and from the output of the register 71 to the bus C2LB in the next cycle.

FIG. 5 represents the architecture of the storage controller CS 59 for executing, in addition to register write operations $W2^mB$, conditional partial write operations $CPW2^{n+m}B$ of a whole number of sub-blocks of $2^m$ bytes within a block, and register read operations $R2^mB$, in the expanded storage unit EMU.

The explanations for the elements common to those in FIG. 4 remain valid. However, the input of the register 71 is no longer directly connected to the bus M2CB, but to an output of a multiplexer 68. The multiplexer 68 has a first input connected to the bus M2CB, a second input connected to an output of a register 75, a third input connected to the output of a multiplexer 76, and a fourth output connected to a second output of the circuit 63. The register 75 has an input connected to a fifth output of the circuit 62. The multiplexer 76 has a first input connected to the output of a register 77 and a second input connected to the output of a register 78. The registers 77 and 78 each have one input in common with the second input of the multiplexer 67. Each register 77, 78 is assigned to the operations related to the data exchanged, respectively, with each of the ports 51, 54 of the circuit 42. The function of the multiplexer 76 is to process the content of the register 77, 78 corresponding to the port 51, 54 to which the operation executed relates. There are actually as many registers 77, 78, and the multiplexer 76 has as many inputs, as there are ports 51, 54 for communicating with remote systems. The output of the multiplexer 76 is also connected to a first input of a comparator 79. The comparator 79 has a second input connected to an output of the multiplexer 80.

The multiplexer 80 has a first input connected to the output of a, register 81 and a second input connected to the output of a register 82. The register 81 has an input connected to a sixth output of the circuit 62, and the register 82 has an input connected to a seventh output of the circuit 62. Each register 81, 82 is assigned to the operations related to the data exchanged, respectively, with one of the ports 51, 54 of the circuit 42. The function of the multiplexer 80 is to process the content of the register 81, 82 corresponding to the port 51, 54 to which the operation executed relates. There are actually as many registers 81, 82, and the multiplexer 80 has as many inputs, as there are ports 51, 54 for communicating with remote systems.

The comparator 79 generates a hit signal as a function of the result of the comparison of the outputs from each of the multiplexers 76 and 80. It also generates an indicator, for example coded in two bits. The indicator is stored in the register 83 to indicate whether the contents of the register 77 and the register 81 are the same or different, or stored in the register 84 to indicate whether the contents of the registers 78 and 82 are the same or different. There are in fact as many registers 83, 84 as there are registers 77, 78.

The registers 75, 77, 78, 81 and 82 have a size equal to the width of the data path, that is $2^m$ bytes.

The disabling of the writing of a sub-block in the stack 64 by the circuit 72 has the effect of writing this sub-block into the register 77, 78 corresponding to the port 51, 54 for which the operation is executed.

A register write operation $W2^mB$ is intended to write the contents of a sub-block originating from a remote system into the register 81 or into the register 82 depending on the port 51, 54 in communication with this remote system. A register write request message $W2^mB$ is, for example, composed of two sub-blocks. A first sub-block constitutes the header of the message and contains, among other things, a code indicating that this is a register write request and indicating the name of the remote system from which the message originated. A second sub-block contains the data to be written into the register 81, 82.

The register write request message arrives from the remote system at the first input of the multiplexer 61 via the bus L2CB. Beginning with the header of the message, the circuit 62 sends the first sub-block to its fifth output, to be sent to the register 75. The content of the register 75 is returned to the bus C2LB by means of the multiplexer 68 and the register 71 in order to indicate to the remote system that the write operation has been processed. The circuit 62 then sends the second sub-block to its sixth or seventh output, to be sent to the register 81 or the register 82 depending on the port 51, 54 in communication with the remote system. The content of the register 81, 82 constitutes an old register value on which an atomic operation is to be carried out in the expanded storage unit EMU by a remote system 1, 2, as it is known by this remote system.

A conditional partial write operation $CPW2^{n+m}B$ is an operation similar to a partial write operation $PW2^{n+m}B$, but it is subject to a logical condition, an example of which is given below.

A partial write request message is generally composed of one or more sub-blocks containing the header of the message followed by sub-blocks of data sent by a remote system 1, 2 to a port 51, 54. The first sub-block of the message arrives at the first input of the multiplexer 61 through the bus L2CB, in a first clock cycle. In a second clock cycle, the first sub-block is transferred into the register 60. The first input of the multiplexer 61 is then available to receive the next sub-block from the bus L2CB. The header of the message contains, among other things, a code indicating that this is a conditional partial write operation $CPW2^{n+m}B$, and indicating an address of the block in which the partial write is to be carried out in the expanded storage unit EMU and the location of a sub-block in the block, coded in n bits. The content of the sub-block thus labelled in the block constitutes a new register value on which an atomic operation is to be carried out in the expanded storage unit EMU by a remote system 1, 2. In connection with the sequencer 73, the combinational logic circuit 62 interprets the sub-block as being the last sub-block of the partial write, sends the 2n bits coding the locations of the first and last sub-block to the register 66 and sends the address of the block to the register 65. The combinational logic circuit 62 then sends the sub-block to be written to the stack 64 via the first input of the multiplexer 67 by setting the input pointer 69 to the location of the sub-block within the block. Next, the combinational logic circuit 63, triggered by the sequencer 73, generates a read request $R2^{n+m}B$ from the content of the register 65, which it transmits to the register 60 via the second input of the multiplexer 61. The combinational logic circuit 62 then sends the read request message to the bus C2MB, to be sent to the expanded storage unit EMU. The input pointer 69 is reset to point to the first input of the stack 64. The data block of the message in response to the read request received from the expanded storage unit EMU by the bus M2CB arrives at the second input of the multiplexer 67 to be transferred sub-block by sub-block into the stack 64. The input pointer 69 is incremented with each arrival of a new sub-block until the entire block is written into the stack 64.

However, the hardwired combinational logic circuit 72, represented in FIG. 5, disables the writing of the registers of the stack 64 into which the sub-blocks of the partial write operation would have been written, sending the writing of these sub-blocks, as they are received via the second input of the multiplexer 67, to the register 77, 78 corresponding to the port 51, 54 through which the partial write request arrived.

In the case of a partial write operation, as described with the aid of FIG. 4, the successive writing of a plurality of sub-blocks into the register 77, 78 simply erases the previous content without disturbing any unconditional partial write operations that are not using the register 77, 78. It is-noted that, advantageously, the architecture of FIG. 5 makes it possible to carry out the operations described above in reference to FIG. 4.

In the case of a conditional partial write operation, which is of particular interest here, the sub-block received via the second input of the multiplexer 67, write-disabled in the stack 64, is written into the register 77, 78 so as to constitute a current register value on which an atomic operation is to be carried out in the expanded storage unit EMU by a remote system 1, 2.

The writing of the block received in the response message is only effective for sub-blocks other than that of the conditional partial write. Thus, the stack 64 contains a block from the expanded storage unit EMU in which the sub-block corresponding to the current register value of the expanded storage unit EMU has been replaced by the sub-block corresponding to the new register value of the expanded storage unit EMU, as received from the remote system 1,2.

The multiplexer 76 sends the current value of the register 77 for an operation related to the port 51, or the current value of the register 78 for an operation related to the port 54, to the first input of the comparator 79. The multiplexer 80 sends the old value of the register 81 for an operation related to the port 51, or the old value of the register 82 for an operation related to the port 54, to the second input of the comparator 79. The result of the comparison is coded, for example in two bits, into a hit signal stored in the register 83, 84 corresponding to the respective register 77 or 78 indicated by the multiplexer 76. The hit signal is also transmitted to the combinational logic circuit 63 which places a condition on the partial write in the manner explained below.

If the hit signal indicates that the current value is equal to the old value, the combinational logic circuit 63, in connection with the sequencer 73, generates a write request header $W2^{n+m}B$ from the content of the register 65, which it loads into the register 60 via the second input of the multiplexer 61. The sequencer 73 then transfers the content of the stack 64, sub-block by sub-block, using the incremented output pointer 70, from the first register of the stack 64 to the register 60 via the third input of the multiplexer 61. Thus, the combinational logic circuit 62 transfers to the bus C2MB a write request message $W2^{n+m}B$, constituted by the header generated by the circuit 63 followed by the block contained in the stack 64, to be sent to the expanded storage unit EMU. Thus, the block written into the expanded storage unit EMU is unchanged except for the sub-block corresponding to the register in which an atomic operation is carried out, whose current value is replaced by a new value. After the writing of the block in the expanded storage unit EMU, the expanded storage unit EMU sends a response message to the bus M2CB which arrives at the first input of the multiplexer 68 to be transferred, via the register 71, to the bus C2LB. The response message is generally composed of one or more sub-blocks containing a write acknowledgement, which are transferred in each clock cycle from the bus M2CB to the input of the register 71, and from the output of the register 71 to the bus C2LB in the next cycle. By receiving this acknowledgement, the remote system is informed that its partial write request has been executed correctly.

If the hit signal indicates that the current value is different from the old value, the combinational logic circuit 63, in connection with the sequencer 73, does not generate a write request header $W2^{n+m}B$ from the content of the register 65. The sequencer 73 does not transfer the content of the stack 64 to the register 60 via the third input of the multiplexer 61. Instead, the combinational logic circuit 63 generates a non-acknowledgement message from the content of the register 65, which it sends through its second output to the register 71, via the fourth input of the multiplexer 68. By receiving this non-acknowledgement message, the remote system is informed that its partial write request has not been executed. The remote system then generates a register read request $R2^{m}B$, which it transmits to the first input of the multiplexer 61 via the bus L2CB.

A register read operation $R2^{m}B$ is carried out in the following way. A read request message sent by a remote system 1, 2 arrives at the first input of the multiplexer 61 through the bus L2CB, in a first clock cycle. In a second clock cycle, the read request message is transferred into the register 60. If the read request message is coded in only one sub-block, the first input of the multiplexer 61 is then available to receive another message from the bus L2CB. In a third clock cycle, the read request message is transferred into the register 75 by means of the combinational logic circuit 62, which transforms it into a response header to be sent to the register 71 via the second input of the multiplexer 68. The response message also carries the result of the comparison. The sequencer 73 then sends the output of the multiplexer 76 to the third input of the multiplexer 68 so as to transmit the content of the register 77, 78, after the content of the register 75, to the bus C2LB. This allows the remote system to know the current value of the register in which an atomic operation is to be executed.

The device presented in FIG. 5 allows a remote system 1, 2 to carry out an atomic operation in an expanded storage unit EMU.

For example, an atomic operation of the "Compare and Swap" type is comprised of replacing the current value of a register OPA of the expanded storage unit EMU with a new value provided by the remote system, on condition that the current value of this register is equal to its old value as known by the remote system at the moment it triggers this atomic operation.

The atomic operation of the "Compare and Replace" type in a register OPA of the expanded storage unit EMU is actuated by the remote system 1, 2 in two steps, followed by a third step in case of failure.

A first step is comprised of loading into a register 81, 82, located in the cabinet. 3 an old value known by the remote system as being the old value of the register OPA prior to this first step.

A second step is comprised of comparing, in the cabinet 3, the content of the register 81, 82, to a current value contained in the register OPA at the time of this second step, and of replacing the content of the register OPA with a new value provided by the remote system 1, 2 if and only if the contents of the register 81, 82 and the register OPA are the same.

A third step, carried out if the contents of the register 81, 82 and the register OPA are different, is comprised of using the current value contained in the register OPA as the old value in the remote system 1, 2.

For another example, an atomic operation of the "Read and Clear" type is comprised of reading the current value of a register OPA of the expanded storage unit EMU via the remote system and of clearing this value. Clearing the value contained in the register OPA is equivalent to setting it to a null value. If the value of the register OPA has already been set to zero by another system, the operation described does not modify the content of the register OPA, which remains at zero. However, the reading of the register OPA informs the remote system that a "Read and Clear" operation has already been executed by another system and is interpreted as a failure. The remote system is free to re-attempt the execution of the atomic operation at a later time.

The success of the atomic operation of the "Read and Clear" type corresponds to the reading of a non-null value of the register OPA. The remote system, having executed the atomic operation successfully, re-writes the value read, or another non-null value, at a later date in order to allow a new atomic operation of the same type to be successful in the register OPA.

The atomic operation of the "Read and Clear" type in a register OPA of the expanded storage unit EMU is actuated by the remote system 1, 2 in two steps, followed by a third step no matter what, in case of either failure or success.

A first step is comprised of loading into a register 81, 82 located in the cabinet 3 a value known by the remote system, systematically equal to zero in this first step.

A second step is comprised of comparing, in the cabinet 3, the content of the register 81, 82 to a current value contained in the register OPA at the time of this second step and of replacing this current value of the register OPA with a new value given as null by the remote system 1, 2 whether the contents of the register 81, 82 and the register OPA are the same or different.

A third step is comprised of using, as the known value in the remote system 1, 2, the current value of the register OPA as defined in the second step.

As a further example, an atomic operation of the "Test and Set" type is comprised of reading the current value of a register OPA of the expanded storage unit EMU via the remote system and of setting the value contained in the register OPA. Setting the value contained in the register OPA is comprised of writing a constant value into it. If the value of the register OPA has already been set by another system, the operation described does not modify the content of the register OPA, which retains the constant value. However, the reading of the register OPA informs the remote system that a "Test and Set" operation has already been executed by another system and is interpreted as a failure. The remote system is free to re-attempt the execution of the atomic operation at a later date.

The success of the atomic operation of the "Test and Set" type corresponds to the reading of a value of the register OPA that is different from the constant. The remote system, having executed the operation successfully, re-writes the value read or another value different from the constant at a later date in order to allow a new atomic operation of the same type to be successful in the register OPA.

The atomic operation of the "Read and Clear" type in a register OPA of the expanded storage unit EMU is actuated by the remote system 1, 2 in two steps, followed by a third step in case of failure.

A first step is comprised of loading in a register 81, 82 located in the cabinet 3 a value known by the remote system, systematically equal to a constant no matter what the remote system.

A second step is comprised of comparing, in the cabinet 3, the content of the register 81, 82 to a current value contained in the register OPA at the time of this second step and of replacing this current value of the register OPA with a new constant value provided by the remote system 1, 2, whether the contents of the register 81, 82 and the register OPA are the same or different.

A third step is comprised of using, as the known value in the remote system 1, 2, the current value of the-register OPA as defined in the second step.

One advantage to executing this atomic operation in the cabinet 3 is that of being able to considerably reduce the critical section by limiting it to just the execution of the second step. The critical section is the part of the process in which any modification of the content of the register OPA other than that required by the atomic operation is forbidden. In order not to disturb the performance of the system, particularly in terms of speed, the duration of the critical section must be as short as possible. However, the communication times between the remote system 1, 2 and the cabinet 3 containing the expanded storage unit EMU are far from negligible. The first step, comprised of transferring the old value of the register OPA as known by the remote system into the register 81, 82 located in the cabinet 3 can take place outside the critical section. Likewise, the third step, which informs the remote system of the current value of the register OPA can take place outside the critical section. By restricting the critical section to just the second step, executed locally in the cabinet 3, its duration is not subject to communication time.

Another advantage to executing this atomic operation in the cabinet 3 is that of being able to protect the critical section from communication errors between the remote system and the cabinet 3 containing the expanded storage unit EMU. In effect, if a communication error occurs during the first or the third step, these steps, which in themselves do not modify the content of the register OPA, need only be restarted. The second step, since it involves only local elements of the cabinet 3, is not susceptible to communication errors.

A current value of the register OPA that is different from its old value as known by the remote system results in a failure of the atomic operation actuated by the remote system, since it means that the content of the register OPA was changed when this atomic operation was actuated and any modification of its content by the remote system runs the risk of causing inconsistency in the data shared by a plurality of systems. In this case, the remote system can take the modification that occurred in the register OPA into account in order to re-actuate an atomic operation using the current value provided by the third step as the old value. The remote system can restart its actuation as many times as necessary in order to succeed.

If the cabinet 3 has a central processor, it is possible to install the register 81, 82 directly inside the expanded storage unit EMU and to process the three steps described above directly in this central processor.

However, advantageously, it may be preferred for the remote systems to directly access the expanded storage unit EMU by reading and writing a data block of $2^{n+m}$ bytes. This, improves the speed of the exchanges between the expanded storage unit EMU and the remote systems.

In the controllers of the expanded storage unit EMC 7, 16, 17 of the cabinet 3, there are as many registers 81, 82 and registers 77, 78 available as there are remote systems in communication with an expanded storage controller EMC by means of the link EML 6, 10. A pair of registers 81, 77 or 82, 78 is specifically assigned to a remote system. This disposition is presented, for example, in FIG. 5, in the circuit CM 50.

In the first step, a register write operation $W2^mB$ actuated by the remote system loads the known value associated with the register OPA into the register 81, 82.

In the second step, a conditional partial write operation $CPW2^{n+m}B$ compares, in the expanded storage controller EMC 7, 16, 17 in the cabinet 3, the content of the register 81, 82 to a current value of the register OPA loaded into a register 77, 78, and replaces the content of the register OPA with a new value provided by the remote system 1, 2, if and only if the contents of the register 81, 82 and the register 77, 78 are the same, using a partial write mechanism in the block of the expanded storage unit EMU containing the register OPA.

In the third step, a register read operation $R2^mB$, actuated by the remote system, transmits to it the content of the register 77, 78. This third step is a function of the result of the two preceding steps, which means that it is not absolutely necessary. The third step will be carried out, for example, following a failure of the second step, in case of a transient failure in the second step, or in case of a disturbance during the conditional partial write operation of the second step.

A partial write operation in a storage block is comprised of a reading of this storage block, and a sub-block replacement followed by a rewriting of the storage block, all of which is carried out indivisibly. This means that no operation can take place in storage between the reading and the re-reading of the modified block in storage.

If a transient failure occurs during the register write operation W2'''B of the first step, it has no effect on the value of the register OPA, which remains unchanged. The operation can be restarted. Likewise, if a link failure occurs during the register read R2'''B of the third step, it has no effect on the result of the atomic operation. It is always possible to restart the register read operation R2'''B in order to know this result.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

What is claimed is:

1. A process for controlling an atomic operation in a first register (OPA) by a data processing system (1, 2), said first register being disposed at a location remote from said data processing system, characterized in that said process comprises two steps followed by a third step which is a function of the result of the first two steps, the first step comprising loading in a second register (81, 82), locally attached to said first register (OPA), a value known by said data processing system (1,2);

the second step comprising comparing, locally relative to said first register (OPA), the value of the content of the second register (81, 82) to a current value in said first register (OPA) and when said value of the content of the second register (81, 82) is equal to the current value in said first register (OPA), replacing said current value with a new value, communicated by the data processing system (1, 2); and the third step comprising communicating to the data processing system (1, 2) said current value of said first register;

the second register (81, 82) is located in a controller (7, 16, 17) locally attached to a memory unit (8) disposed at a location remote from said data processing system (1, 2); and said controller (7, 16, 17) comprises a third register (77, 78) having an input operatively connected for receiving data originating from the memory unit (8) and further including the step of writing the current value of the first register (OPA) into said controller following a command to partially write a block of the memory unit (8) containing said first register (OPA) so as to write the new value into said first register (OPA).

2. A process for controlling an atomic operation in a first register (OPA) by a data processing system (1, 2), an expanded storage (3) disposed at a location physically remote from said data processing system, said expanded storage (3) including the first register (OPA) and a second register (81, 82) connected to a memory unit (8) disposed at the location of said expanded storage (3), said expanded storage (3) further including said controller (7, 16, 17) having a third register (77, 78) with an input operatively connected for receiving data originating from the memory unit (8) wherein said process comprises two steps followed by a third step which is a function of the result of the first two steps, the first step comprising loading in a second register (81, 82), locally attached to said first register (OPA), a value known by said data processing system (1,2);

the second step comprising comparing locally in said expanded storage (3), the value of the content of the second register (81, 82) to a current value in said first register (OPA) and when said value of the content of the second register (81, 82) is equal to the current value in said first register (OPA), replacing said current value with a new value, communicated by the data processing system (1, 2); and the third step comprising communicating to the data processing system (1, 2) from the expanded storage (3) said current value of said first register; and further including the step of writing the current value of the first register (OPA) into said controller following a command to partially write a block of the memory unit (8) containing said first register (OPA) so as to write the new value into said first register (OPA).

3. The process for controlling an atomic operation according to claim 2, characterized in that the current value is replaced by the new value if and only if the result of the comparison indicates that the content of the second register is equal to the current value.

4. The process for controlling the atomic operation according to claim 3, further comprising repeating the first step in the event of any interference occurring before the execution of the second step, and executing the third step upon any interference occurring during the execution of the second step.

5. The process for controlling an atomic operation according to claim 2, characterized in that the current value is replaced by the new value if and only if the result of the comparison indicates that the content of the second register is equal to the current value.

6. The process for controlling the atomic operation according to claim 5, further comprising repeating the first step in the event of any interference occurring before the execution of the second step, and executing the third step upon any interference occurring during the execution of the second step.

7. The process for controlling atomic operation according to claim 2, characterized in that the current value is replaced by the new value no matter what the result of the comparison and in that the first two steps are always followed by the third step.

8. The process for controlling atomic operation according to claim 1, characterized in that the current value is replaced by the new value no matter what the result of the comparison and in that the first two steps are always followed by the third step.

9. A control device comprising a memory stack (64), a first multiplexer (67) connected to said stack, and a first combinational logic circuit (62), said stack receiving at least a first and a second input, said first input being connected to a first bus (M2CB) via said multiplexer, a memory unit (8) connected to said first bus (M2CB) for transferring data originating from said memory unit to said stack via said multiplexer, a second bus (L2CB) for transferring data originating from a remote data processing system (1, 2) to said second input of said stack (64), a third bus (C2MB), said first combinational logic circuit (62) having an output connected to said third bus (C2MB) and an input connected to an output of said memory stack (64),

- a first register (77, 78) having an input operatively connected to the first bus (M2CB) for receiving data originating from the memory unit (8) and an output for sending data to the remote data processing system (1, 2),
- a second multiplexer (68) having an input connected to receive the output of said first register (77, 78) and an output connected to a fourth bus (C2LB), and
- a second combinational logic circuit (72) for disabling the writing of at least one input of the stack (64) and for sending data directed to said disabled input to said first register (77, 78).

10. The device according to claim 9, characterized in that it further comprises:

- a second register (81, 82) having an input connected to the second bus (L2CB); and
- a comparator (79) having a first input connected to an output of the first register (77, 78), a second input connected to an output of the second register (81, 82) and an output operatively connected for driving at least one output of the memory stack (64).

11. The control device according to claim 10, further comprising a locking device (74) adapted to adhere to a circular-type priority for access to the memory unit (8) by a plurality of controllers (7, 16, 17).

12. The device according to claim 11, characterized in that said device is duplicated n times so as to allow processing of n indivisible operations simultaneously, a critical section being limited to a local partial write time.

13. The control device according to claim 9, further comprising a locking device (74) adapted to adhere to a circular-type priority for access to the memory unit (8) by a plurality of storage controllers (7, 16, 17).

14. The device according to claim 13, characterized in that said device is duplicated n times so as to allow processing of n indivisible operations simultaneously, a critical section being limited to a local partial write time.

* * * * *